Patented Sept. 6, 1927.

1,641,413

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE COMPOSITION OF LOW INFLAMMABILITY.

No Drawing. Application filed December 21, 1925. Serial No. 76,774.

This invention relates to cellulose acetate compositions of low inflammability. One object of the invention is to provide a cellulose acetate composition the inflammability of which is reduced to an important extent so that it becomes relatively safe, even in the film, lacquer and plastic arts. Another object is to provide a composition which may be made into transparent, strong, flexible films that are substantially waterproof, are unaffected by ordinary photographic baths and have low inflammability. Still another object of my invention is to produce a composition which may be used in film, varnish or plastic manufacturing without injury to or being injured by the substances with which it is associated during manufacture, storage or use. Further objects will hereinafter appear.

I have found that cellulose acetate compositions having the desirable qualities enumerated above, can be obtained by mixing cellulose acetate, preferably of the acetone-soluble type, with a compound selected from the group of the brom-nucleo substitution products of aniline and toluidine, said mixture being mixed to be neutral and said substitution product being, when mixed, free from uncombined bromine and hydrobromic acid. I may employ any one of said group, such as 2-4-6 tribromo aniline, ortho meta or para monobromo aniline, 2-4 dibromo aniline, 3-5 dibromo ortho toluidine, 3-5 dibromo para toluidine, 2-4-6 tribromo meta toluidine. Mixtures of these may be employed.

Compositions of cellulose acetate and the above named brom substitution products have a suprising degree of practical non-inflammability. They slow down the propagation of combustion of the composition to a very unexpected extent. Films made from such compositions, when ignited, often go out and must be reignited several times during the test, the flame traveling along the film very slowly.

The ingredients of my composition may be combined in varying proportions. In the preferred form of my invention I dissolve 100 parts by weight of acetone-soluble cellulose acetate in 300 to 500 parts of acetone, along with 4 to 16 parts of 2-4-6 tribromo aniline. Such a composition containing 100 parts of cellulose acetate in 400 parts of acetone and 10 parts of 2-4-6 tribromo aniline is suitable for manufacture into film by the usual methods.

The ingredients are mixed thoroughly to form a homogeneous solution or flowable mass which is filtered if desired. When more flowable solutions are desired, or when the compositions are to be employed as lacquers, the volatile solvent may be increased, as will be understood by those skilled in the art, or volatile non-solvents, such as benzol, alcohol, and the like may be added, but not to the point where precipitation occurs. Along with the ingredients given in the above examples, I may add one or more organic bodies of only slight volatility which enhance the plasticity or flexibility of the compositions, and regulate the preparation of film therefrom; but such bodies are not preferred or essential. Examples of them are amyl or butyl acetate, the various amyl alcohols, the various butyl alcohols, and mixtures of them. Films prepared from the hereinabove described compositions are flexible, smooth and transparent. It is an inherent property of a composition, such as that illustrated above, that it may be flowed at ordinary or room temperatures

Having thus described my invention, what I claim as new and desire to secure by Letters Patent is:

1. A composition of matter comprising cellulose acetate, and a compound selected from the group of brom-nucleo substitution products of aniline and toluidine.

2. A film-forming composition flowable at room temperature comprising cellulose acetate, a compound selected from the group of brom-nucleo substitution products of aniline and toluidine, an organic body of only slight volatility that enhances the flexibility of the films, and a volatile solvent common to all said ingredients.

3. A composition comprising cellulose acetate and 2-4-6 tribromo aniline.

4. A film-forming composition flowable at room temperature comprising acetone-soluble cellulose acetate, 2-4-6 tribromo aniline and a solvent common to said ingredients.

5. As an article of manufacture, a flexible, transparent film comprising cellulose acetate and a compound selected from the group of brom-nucleo substitution products of aniline and toluidine.

6. As an article of manufacture, a flexible, transparent, flowed film, which comprises acetone-soluble cellulose acetate and tribromo aniline.

Signed at Rochester, New York, this 30th day of November, 1925.

STEWART J. CARROLL.